United States Patent
Schiefer

(10) Patent No.: US 7,805,482 B2
(45) Date of Patent: Sep. 28, 2010

(54) METHOD OF CORRELATING EVENTS IN DATA PACKET STREAMS

(75) Inventor: Josef Schiefer, Vienna (AT)

(73) Assignee: Senactive IT-Dienstleistungs GmbH, Vienna (AT)

(*) Notice: Subject to any disclaimer, the term of this patent is extended or adjusted under 35 U.S.C. 154(b) by 909 days.

(21) Appl. No.: 11/322,970

(22) Filed: Dec. 30, 2005

(65) Prior Publication Data

US 2007/0156916 A1 Jul. 5, 2007

(51) Int. Cl.
*G06F 15/16* (2006.01)
*G06F 15/173* (2006.01)
*G08B 19/00* (2006.01)

(52) U.S. Cl. .................. 709/201; 709/226; 709/228; 709/232; 709/238; 726/13; 340/521; 340/522

(58) Field of Classification Search .......... 709/201, 709/232
See application file for complete search history.

(56) References Cited

U.S. PATENT DOCUMENTS

| | | | | |
|---|---|---|---|---|
| 4,570,217 A | * | 2/1986 | Allen et al. ............. | 700/83 |
| 5,404,550 A | * | 4/1995 | Horst .................... | 712/14 |
| 5,471,631 A | * | 11/1995 | Beardsley et al. ........ | 713/502 |
| 5,745,714 A | * | 4/1998 | Glass et al. ............. | 715/788 |
| 5,764,686 A | * | 6/1998 | Sanderford et al. ....... | 375/149 |
| 6,067,587 A | * | 5/2000 | Miller et al. ............ | 710/20 |
| 6,108,654 A | * | 8/2000 | Chan et al. ............. | 707/8 |
| 6,212,566 B1 | * | 4/2001 | Vanhoof et al. ........... | 709/230 |
| 6,336,139 B1 | * | 1/2002 | Feridun et al. ........... | 709/224 |
| 6,697,791 B2 | * | 2/2004 | Hellerstein et al. ....... | 706/47 |
| 6,789,257 B1 | * | 9/2004 | MacPhail ................ | 719/316 |
| 6,868,367 B2 | * | 3/2005 | Yemini et al. ............ | 702/183 |
| 7,284,048 B2 | * | 10/2007 | Jakobson et al. .......... | 709/224 |
| 7,302,686 B2 | * | 11/2007 | Togawa .................. | 718/103 |

(Continued)

FOREIGN PATENT DOCUMENTS

JP 2004110327 A * 4/2004

OTHER PUBLICATIONS

Robust Event Correlation Scheme For Fault Identification in Communications Network by Chi-Chun Lo, Shing-Hong Chen, Global Telecommunications Conference, Nov. 8-12, 1998, pp. 3745-3750, vol. 6. ISBN: 0-7803-4984-9.*

(Continued)

*Primary Examiner*—Ashok B. Patel
*Assistant Examiner*—Linglan Edwards
(74) *Attorney, Agent, or Firm*—Hoffmann & Baron, LLP

(57) ABSTRACT

A method of correlating events in a stream of data packets in which each data packet includes an event type identifier and an attribute associated with a type of event. A plurality of data packets of the stream of data packets is received and correlation set of selectors is applied to the received data packets. Each selector of the correlation set of selectors is responsive to data packets of a predetermined type of event to extract the attribute from the data packets. The method further includes assessing two or more data packets of the received data packets as correlating events if attributes extracted from the two or more data packets match. Additionally, the method includes accessing a correlation session in a data store for each correlating events match, the correlation session holding data items of tasks that process said correlating events.

20 Claims, 6 Drawing Sheets

U.S. PATENT DOCUMENTS

| | | | | |
|---|---|---|---|---|
| 7,305,492 | B2* | 12/2007 | Bryers et al. | 709/249 |
| 7,352,280 | B1* | 4/2008 | Rockwood | 340/521 |
| 7,461,403 | B1* | 12/2008 | Libenzi et al. | 726/24 |
| 2002/0188618 | A1* | 12/2002 | Ma et al. | 707/102 |
| 2003/0145074 | A1* | 7/2003 | Penick | 709/223 |
| 2003/0200192 | A1* | 10/2003 | Bell et al. | 707/1 |
| 2004/0019679 | A1* | 1/2004 | E et al. | 709/226 |
| 2004/0117510 | A1* | 6/2004 | Arimilli et al. | 709/253 |
| 2004/0119814 | A1* | 6/2004 | Clisham et al. | 348/14.08 |
| 2004/0161090 | A1* | 8/2004 | Digate et al. | 379/202.01 |
| 2004/0225742 | A1* | 11/2004 | Loaiza et al. | 709/229 |
| 2005/0102681 | A1* | 5/2005 | Richardson | 719/321 |
| 2006/0041659 | A1* | 2/2006 | Hasan et al. | 709/224 |

OTHER PUBLICATIONS

Platform Independent Event Correlation Tool for Network Management by Vaarandi, R. Network Operations and Management Symposium, 2002, NOMS 2002, Apr. 15-19, 2002, pp. 907-909. ISBM: 0-7803-7382-0.*

Real-time log file analysis using the Simple Event Correlator (SEC) by John P. Rouillard, 18th LISA conference proceedings, Nov. 2004. pp. 133-149.*

"Composite Events for Network Event Correlation", Proceedings of the Sixth IFIP/IEEE International Symposium on Integrated Network Management, Distributed Management for the Networked Millennium, 1999, pp. 247-260.*

Schiefer et al., *Correlating Events for Monitoring Business Processes* (2004), http:www. ifs.tuwien.ac.at/~js/download/iceis2004.pdf.

\* cited by examiner

METHOD OF CORRELATING EVENTS IN DATA PACKET STREAMS

TECHNOLOGICAL BACKGROUND

In the network management domain various approaches have been proposed for event correlation including rule-based systems, model-based reasoning systems, fault propagation models, and the code-book approach.

A traditional approach to event correlation is that of rule-based analysis. Rule-based systems are composed of rules in the form of "conclusion if condition" which are used to match incoming events. Based on the results of each test, and the combination of events in the system, the rule-processing engine analyzes data until it reaches a final state. The condition part is a logical combination of propositions about the current set of received alarms and the system state; the conclusion is determined by the state of the correlation process. Rule-based systems require a time-consuming translation of the processes to model into rules and large amounts of processing power to apply all rules in a real-time environment.

Another group of approaches incorporates an explicit representation of the structure and function of the system being diagnosed. The representation provides information about dependencies of components in the network or about cause-effect relationships between network events. The fault discovery process explores the network model to verify correlation between events. While these approaches can be used for a wide range of continuous queries, the actual processing of the selected data has to be specified in a query statement and the processing of the query is hidden from the developers. This makes it difficult for developers to implement user-defined functions because all processing is limited to the functionality provided by the query language.

SUMMARY OF THE INVENTION

It is an object of the invention to overcome the problems associated with the prior art and to propose a method of correlating events which allows fast implementations of event flow handling for all kinds of technical and commercial processes and which can be performed in real-time without undue processing power, especially in distributed computing environments.

To this end, the invention proposes a method of correlating events in a stream of data packets each representing an event, each data packet carrying at least one attribute of its event, comprising:

classifying events according to event types and incorporating an identifier of the type of its event into each data packet, providing at least one correlation set of selectors, each selector being responsive to data packets of a predetermined event type identifier only and extracting one or more attributes therefrom, applying said correlation set of selectors to said stream of data packets, and assessing two or more data packets as correlating events if the attributes so extracted by the responding selectors match.

The method of the invention enables the fast real-time correlation of events in event processing systems, regardless of their technical scope of application, and a quick and easy-to-understand modelling and implementation of such systems. The invention can be carried out in all fields of application, e.g. industrial process controls, data processing systems, telecommunications networks, network management systems etc.

According to a preferred embodiment the method of the invention further comprises:

for each correlation assessed, creating or accessing a correlation session in a data store, which correlation session is used for holding data items of tasks processing said correlating events.

Correlation sessions based on event types provide direct access to correlated event data and leave the developer with the simplified task of developing processing logic for the event services. Developers can reconfigure the behavior of correlation sessions without changing any code, making components useful in a wider range of contexts. The configuration of correlation session includes correlation sets which define the selectors for event types. Based on the configuration information, the system automatically associates events according to their event types and the selectors responsive thereto as defined in the correlation set. The extracted event data is used by the system to create or activate correlation sessions that can be used by developers for maintaining states in their processing logic.

Further preferred features and embodiments of the invention are defined in the enclosed claims and will now be described in more detail with reference to the enclosed drawings, in which:

SHORT DESCRIPTION OF THE DRAWINGS

DETAILED DESCRIPTION OF THE PREFERRED EMBODIMENTS

Preferred embodiments of the invention and their best modes of execution will now be disclosed by means of the following examples of applications:

1) the correlation of events in an event data packet stream by means of event types, including the management of data items with correlation sessions for events which have been assessed as correlating,
2) the synchronization of processing tasks for events which have been assessed as correlating as in example 1, and
3) the introduction of virtual event types into the embodiments of the examples 1 and 2.

Example 1

Event Correlation by Event Types

Figure 1:
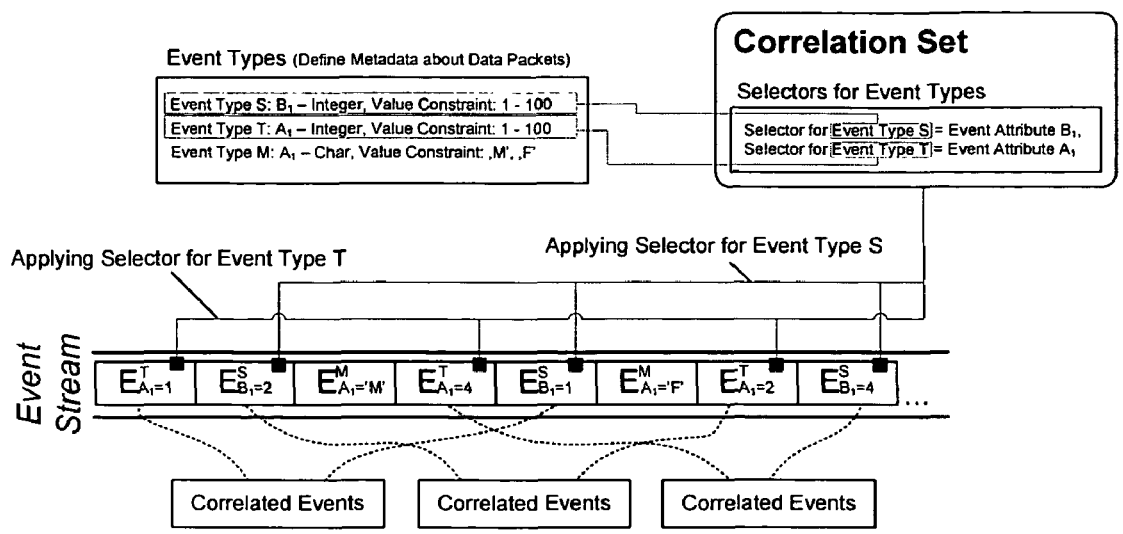
FIG. 1 shows the application of the method of the invention for correlating events in a data packet stream by means of selectors responding to event type identifiers.

FIG. 1 shows the application of a method of correlating events in a stream of data packets E each representing an event. Each data packet E has an identifier T, S, M etc. of the type of its event and at least one attribute $A_1$, $B_1$, etc. of this event.

As will be further explained in detail below, the method comprises the following steps:
classifying events according to event types and incorporating an identifier of the type of its event into each data packet,
providing at least one correlation set of selectors, each selector being responsive to data packets of a predetermined event type identifier only and extracting one or more attributes therefrom,
applying said correlation set of selectors to said stream of data packets, and
assessing two or more data packets as correlating events if the attributes so extracted by the responding selectors match.

In general, the time instant of an event is relative to the time granularity that is needed or desired. Thus, certain activities that are of short duration relative to the time granularity are represented as a single event. An activity spanning some significant period of time is represented by the interval between two or more events. For example, a system transaction might have a "begin-transaction-processing" and "end-transaction-processing" event-pair.

The event attributes $A_1$, $B_1$ hold information about the context within which an event occurred, e.g. about agents, resources, the result of an activity (e.g., the result of a system transaction), or any other information that gives character to the specific occurrence of that type of event. The attributes form the structure of an event data packet which formally comprises an event type identifier.

Elements of the context of a certain event type can be used to define a relationship with elements of the context of other event types. This relationship can be expressed by a correlation set which includes a set of selectors for extracting the elements from an event of a certain event type. The extracted data can e.g. be used to create or activate a data container in the form of a correlation session for storing arbitrary data (=session data), as will be further explained with reference to FIG. 2.

An event correlation is defined by a correlation set which consists of a set of selectors for various event types. During the event processing, the correlation set is used as follows:
For a given event of an event stream, an event correlation is performed successfully if
1) the event type of the given event conforms to the event type of one of the selectors of the correlation set,
2) this selector is used to extract one or more event attributes from the events,
3) the extracted event data is used to assess the correlation of events.

Figure 2:
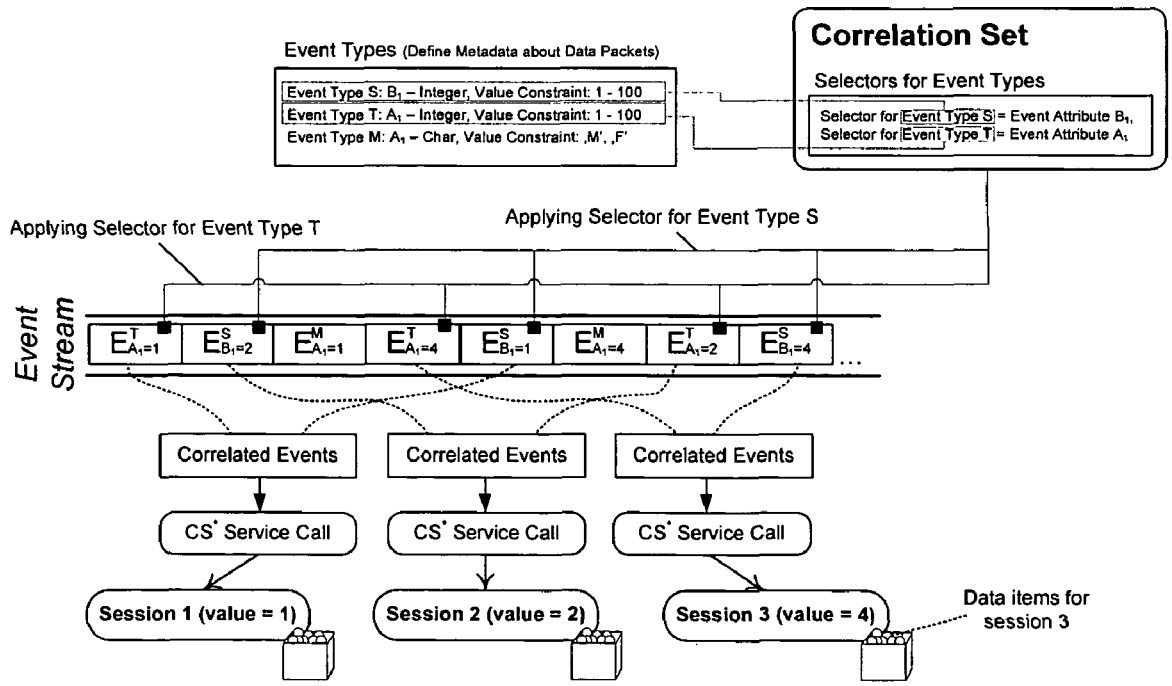
FIG. 2 shows a preferred embodiment of the method of FIG. 1 on the basis of sessions created for correlated events.

FIG. 2 shows a preferred embodiment of the method of FIG. 1 wherein the assessed correlations are used to-directly or by means of an intermediate service-establish, access, modify and destroy sessions for managing data items of correlated events. These sessions will be called "correlation sessions" in the following.

In FIG. 2 an event stream with a correlation of two event types is shown: events of type T that include an attribute $A_1$ and events of type S that include an attribute $B_1$. Assuming that we use the attribute $A_1$ and $B_i$ for correlating the events, we will create a separate correlation session for each different value of the attribute $A_1$ and $B_1$. For instance, in FIG. 2, Session 3 is managing data items for all events of type T that have an attribute $A_1$ with the value 4 and all events of type S that have an attribute $B_1$ also with the value 4. This means in particular:

Elements of an event content (such as event attributes) of a certain event type can be used to define a relationship between elements of an event context of other event types.
This relationship is defined by a correlation set which has selectors for event types.
The selectors are used to extract attributes from events.
The selected data is sued to create or activate a data container for storing data or correlated events.
The container for holding the data of correlated events is defined as a correlation session container.

Managing Correlation Sessions Based on Event Types

Figure 3:
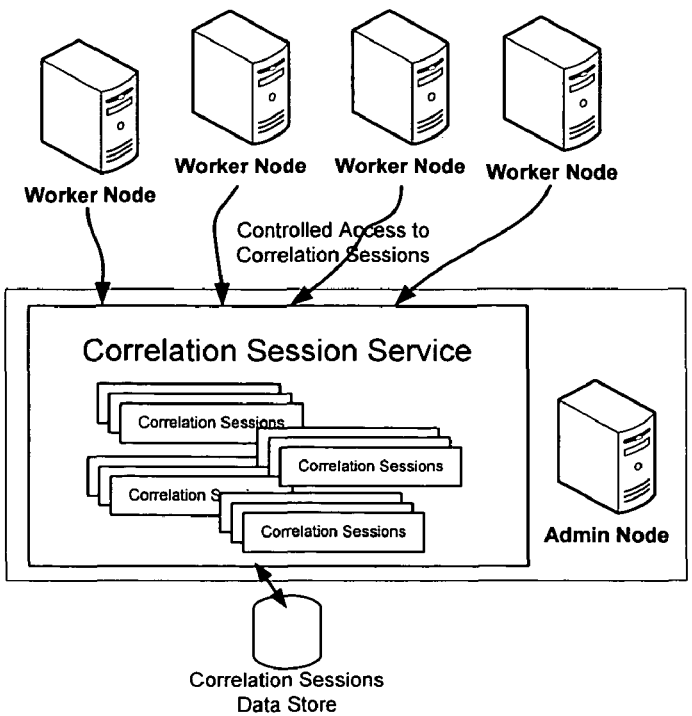
FIG. 3 shows a block diagram of a computing network having distributed worker nodes and a centralized administration node for the methods of FIGS. 1 and 2.

FIG. 3 shows how correlation sessions based on event types can be managed in a distributed environment.

In FIG. 3 correlation sessions are centrally managed by a dedicated administration node (admin node). Event processing is performed on distributed worker nodes. During event processing the worker nodes apply selectors of a correlation set to a stream of data packets, and assess two or more data packets as correlating events if the attributes so extracted by the responding selectors match. The extracted attributes are used by the worker nodes to create or activate correlation sessions via a central correlation session service running on the administration node. The correlation session service on the administration node has the role of a coordinator and it ensures that only one worker node can access a single correlation session at the same point in time. In the case that two worker nodes want to use the same correlation session, the correlation session service automatically blocks the request of the second worker node as long the correlation session is in use of the first worker node. In other words, the correlation session service ensures exclusive access to correlation sessions for a single worker node which can be a prerequisite for the consistent functioning of correlation sessions in specific distributed environment applications.

If no correlation sessions should be lost after a computer crash, the correlation session service stores the data of correlation sessions in a data store. This way, the correlation session service is able to recover after a computer crash by retrieving the latest data for correlation sessions from the data store.

Correlation Sessions and Transactions

Figure 4:
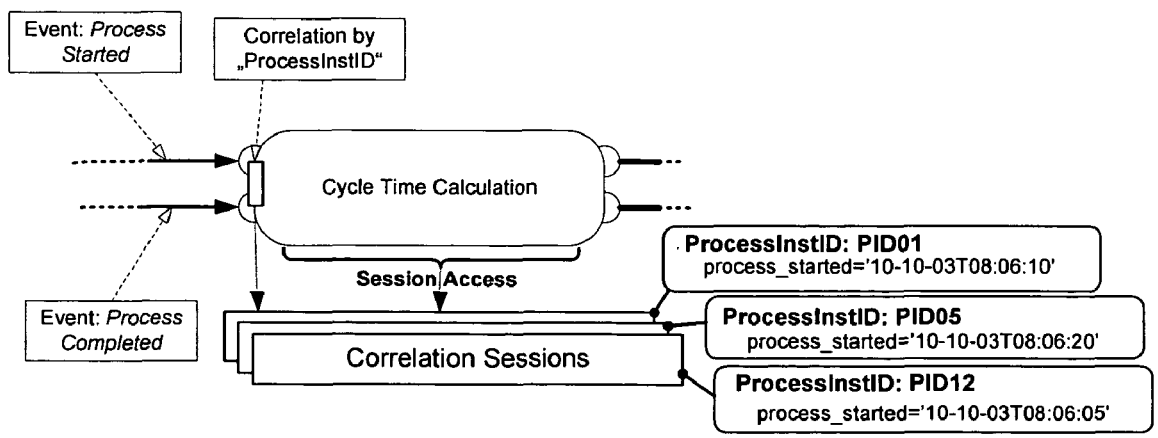
FIG. 4 shows an exemplary application of the event correlation methods of FIG. 1 to 3 for the calculation of cycle times in technical processes.

During the event processing event services can create, destroy and change correlation sessions. FIG. 4 shows an example where correlation sessions are used to calculate the cycle time of technical processes. In this example the "Process Started" and "Process Completed" events are correlated in order to collect the data for calculating the cycle time of a technical process instance. For each process instance there is a "Process Started" and "Process Completed" event. Therefore, these two events are correlated by the event attribute "ProcessInstID" which represents an ID of the process instance. If the "Process Started" event is received by the event service "Cycle Time Calculation", a new correlation session is automatically created and the event service stores the timestamp about the process start into the session (see "process_started" data items in FIG. 4). When the "Process Completed" event is received, the event service uses the timestamp of the correlation session in order to calculate the cycle time (cycle time=timestamp "Process Completed"- timestamp "Process Started"). After the calculation of the cycle time the correlation session is destroyed.

In the previous example correlation sessions are created, accessed, modified and destroyed. These operations are done in context of other processing steps. For example, for calculating the cycle time the following steps are performed: 1) extraction of the event attribute "ProcessInstID" by means of the respective selector which has responded to the event type identifier for "Process Completed" events, 2) access correlation session for retrieving the timestamp of the correlating "Process Started" event, 3) calculation of the cycle time, 4) destruction of the correlation session, and 5) publishing of the cycle time as new event. In order to ensure consistency, all these steps are performed atomic in a single transaction. If one of the steps fails the transaction is rolled back. For instance, if the publishing of the cycle time as new event fails, also the correlation session destruction and all previous steps are undone by a rollback of the transaction.

Correlation Sessions and Time Windows

The processing of recent data or data with certain freshness is often a requirement for the event stream processing. An example would be the processing of recent phone call data of a particular customer within a certain period of time (e.g. several hours or days). A correlation session can help in this scenario to find fraud patterns by 1) collecting and processing most recent call data, 2) correlating the phone call events and other technical or commercial events of a particular customer.

Figure 5:
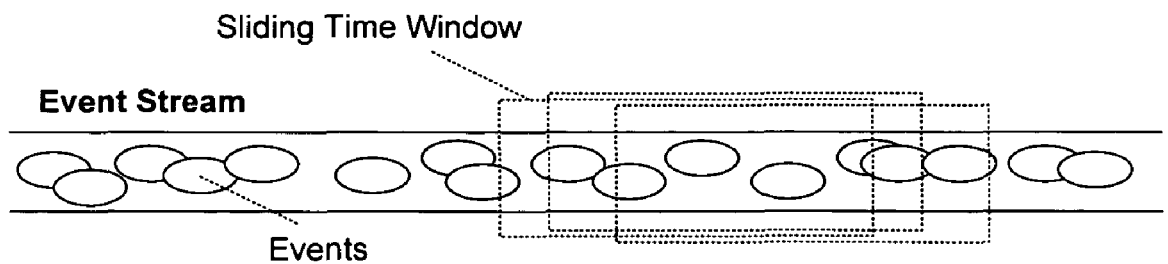
FIG. 5 shows the effect of expiration times for the correlation sessions of FIG. 2 in order to establish sliding time windows for event streams.

Correlation sessions are a simple but effective mechanism for capturing and processing the data of a moving time window. FIG. 5 illustrates an event stream with sliding time windows.

Correlation sessions based on event types can be configured to hold their session data only for a certain time interval. When data items are added to the session, they can have a lifetime assigned to it. After attaching the data items to the session, the data item will stay in the session until they expire. Expired data items will be automatically removed from the session by the correlation session service. Since the data items only stay in the correlation session for a certain period of time, the correlation session hold data of a time window that moves along with the most recent event.

Figure 6:
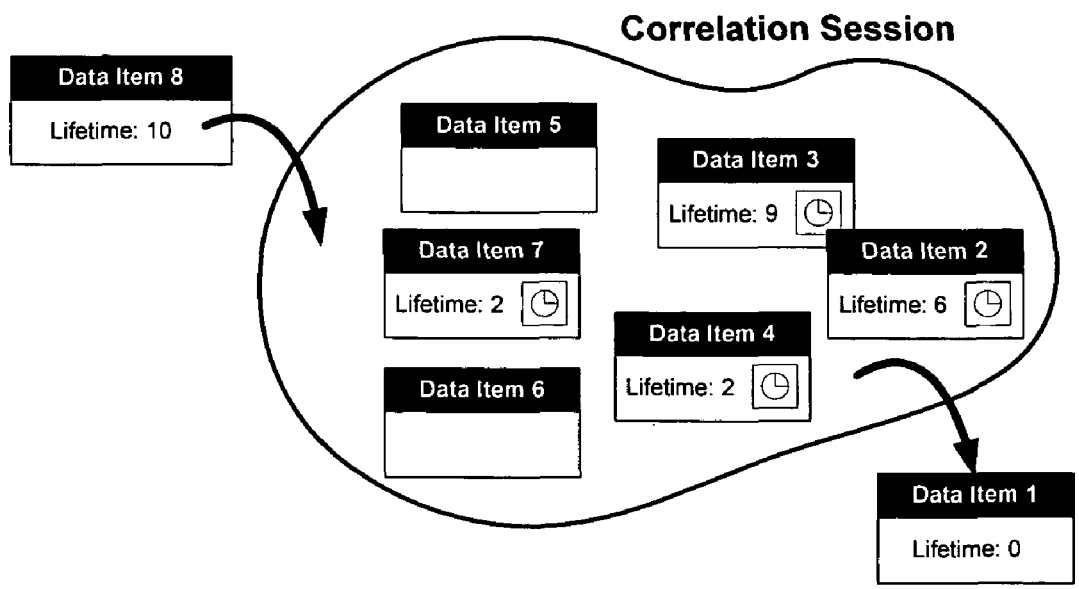
FIG. 6 shows the effect of expiration times for data items within the correlation sessions of FIG. 2.

FIG. 6 shows an example of a correlation session with six data items. Four of the six data items have a lifetime and they expire after a certain period of time. The other two data items (data item 5 and 6) are permanent and do not expire. The lifetime of the data items is individually monitored by the correlation session service and it will automatically remove the expired data items.

The lifetime of data items can be defined programmatically or declaratively in the configuration. If data items are added programmatically, developers can assign individually different lifetimes to the data items. In other words, this mechanism allows them to control for each data item how long it should be available for future event stream processing.

For performing time window operations, the current data in the correlation session is always being processed. Therefore, operations that access a correlation session do not have to care about filtering the correct set of data for a time window.

Example 2

Event Synchronisation by Locks

The event synchronization is based on the same mechanisms as the event correlation and goes further beyond. Instead of using correlation session for correlated event data, event synchronization uses locks for synchronizing event processing steps.

An event synchronization is defined by a correlation set which consists of a group of selectors for various event types. During the event processing, the correlation set is used as follows:

For a given event of an event stream, an event synchronization is performed successfully if 1) the event type of the given event conforms to the event type of one of the selectors of the correlation set, 2) this selector is used to extract one or more event attributes from the events, 3) the extracted event data is used to issue locks, and 4) the locks are used to control the concurrency of event processing steps.

Figure 7:
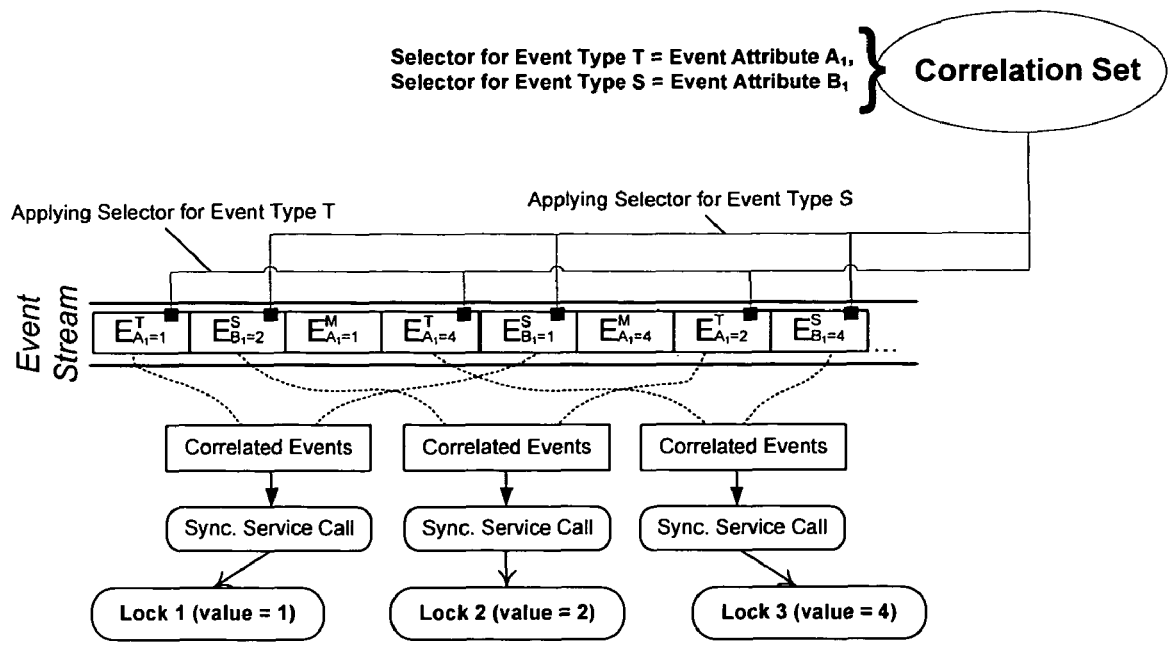
FIG. 7 shows another preferred embodiment of the method of FIG. 1 on the basis of locks for synchronizing event processing tasks.

FIG. 7 shows an event stream with a synchronization of events of two types: events of type T that include an attribute $A_1$ and events of type S that include an attribute $B_1$. Although the events are received on this example in sequence, the processing tasks of these events are executed in parallel. Event synchronization controls the concurrent event processing tasks and ensures that the processing of certain events is not executed in parallel for various reasons (for instance, concurrent event processing causes side effects, deadlocks or unlicensed resource usage).

In this example it is assumed that the attribute $A_1$ of the event type T and the attribute $B_1$, of the event type S are used for synchronizing event processing steps. A separate lock for each different value of the attribute $A_1$ and $B_1$ is issued by a synchronisation service. For instance, in FIG. 7 Lock 2 is used for all events of type T that have an attribute $A_1$ with the value 2 and all events of type S that have an attribute $B_1$ also with the value 2. If Lock 2 is issued for a processing step, this processing step is able to block other processing steps that also would like to acquire Lock 2.

The following steps describe how Lock 2 synchronizes event processing tasks of FIG. 1:

1) If event $E_{B1=2}^{S}$ is received, an event processing task for this event starts and Lock 2 is issued.

2) During the processing of the event $E_{B1=2}^{S}$ another event $E_{A1=2}^{T}$ is received. The processing of the event $E_{A1=2}^{T}$ will be blocked as long as the event processing task of $E_{B1=2}^{S}$ is in progress. The event of $E_{A1=2}^{T}$ is automatically blocked since $E_{A1=2}^{T}$ also would have to issue Lock 2.

3) The processing of the event $E_{A1=2}^{T}$ starts when Lock 2 is released after the completion if the event processing task for $E_{B1=2}^{S}$.

4) The event processing task of $E_{A1=2}^{T}$ completes; the event $E_{B1=2}^{S}$ and $E_{A1=2}^{T}$ were processed in sequence.

In short:
  Elements of an event context (such as event attributes) of a certain event type can be used to define a relationship between elements of an event context of other event types.

This relationship is defined by a correlation set which has selectors for event types.

The selectors are used to extract attributes from events. The selected data is used to issue locks for synchronizing event processing steps.

Managing Locks in a Distributed Environment

Figure 8:
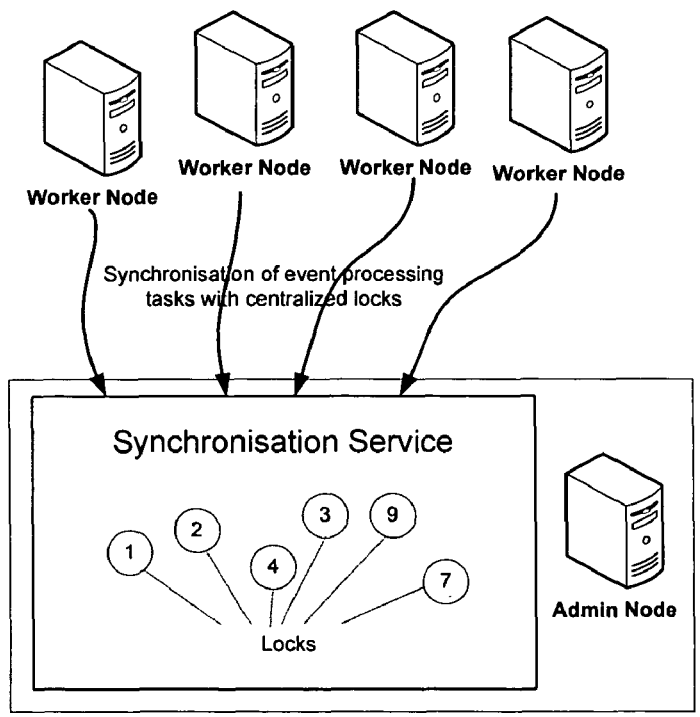
FIG. 8 shows a block diagram of a computing network having distributed worker nodes and a centralized administration node for the method of FIG. 7.

FIG. 8 shows how locks can be managed in a distributed environment.

Locks are centrally managed by a dedicated administration node (admin node). The event processing is performed on distributed worker nodes. During event processing the worker nodes apply selectors of a correlation set to a stream of data packets, and assess two or more data packets as correlating events if the attributes so extracted by the responding selectors match. The extracted attributes are used by the worker nodes to issue locks via central a synchronization service running on the administration node. The synchronization service on the administration node has the role of a coordinator and it ensures that only tone worker node can use a lock at the same point in time. In the case that two worker nodes want to use the same lock, the synchronization service automatically blocks the request of the second worker node as long as the lock is not released by the first worker node.

Furthermore, synchronization service also allows a limited number of worker nodes to issue a lock at the same time. This mechanism can be used to throttle the parallel processing of an event service among worker nodes.

Figure 9:
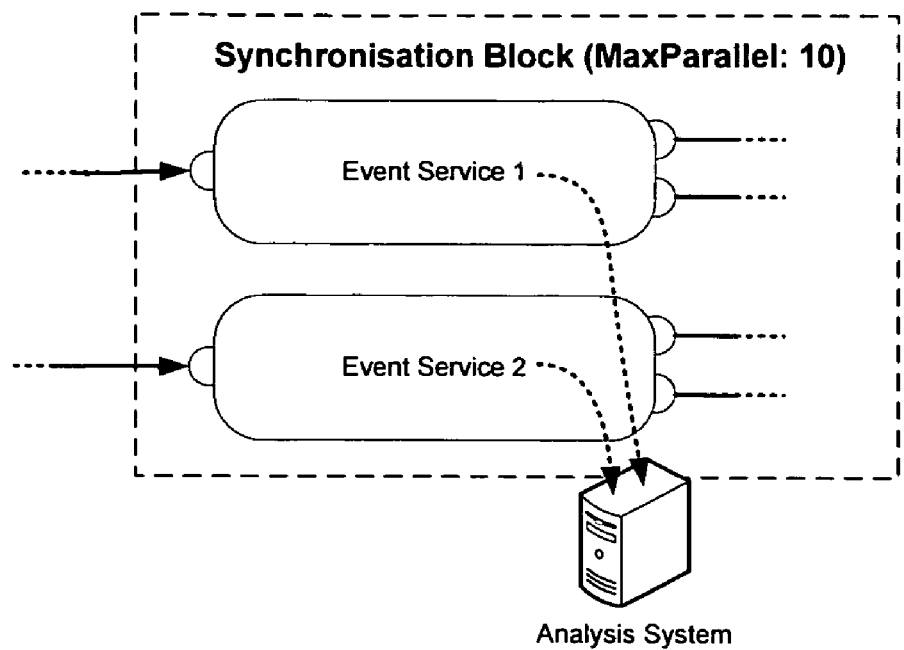
FIG. 9 shows an application of the locks of FIGS. 7 and 8 to restrict the access to external resources.

FIG. 9 shows a first application of lock handling wherein the synchronisation obtained can be used to restrict the access of processing tasks (here: Event Service 1, Event Service 2) to e.g. an external analysis system.

Figure 10:
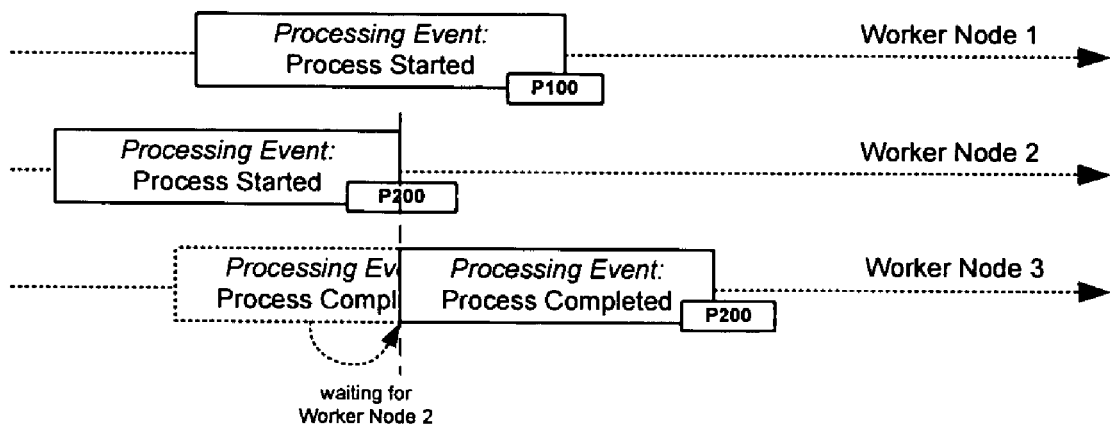
FIG. 10 shows another application of the locks of FIGS. 7 and 8 to serialize the order of event processing tasks.

The created locks can also be used to serialize the order of processing tasks for events which have been assessed as correlating events. FIG. 10 shows such a second application of the locks for serializing processing tasks (here: "Processing Event: Process Started P200" on Worker Node 2 and "Processing Event: Process Completed P200" on Worker Node 3) which need to consecutively process a common resource (here: "Process P200").

Locks and Transactions

An event processing task can issue a lock from the synchronization service. If the event processing task is executed as an atomic transaction, the synchronization service has to participate in this transaction. If the transaction for the event processing task completes, the synchronization service automatically releases all locks that were previously issued for the event processing task.

Example 3

Virtual Event Types

As described so far, for purposes of maintaining information about an action (e.g. something changed in an industrial process control environment), event data packets can have attributes about the context when the event occurred. Event attributes hold information about e.g. agents, resources, the result of an activity (e.g. the result of a system transaction), or any other information that gives character to the specific occurrence of that type of event. The attributes form the structure of an event which is formally defined by an event type. In other words, an event type formally defines the structure of an event. These event types are "concrete" event types, called herein also simply "event types".

In further detailing the above concept of event types, a so-called "virtual event type" is created which allows to conjoin existing event types by merging conjunct (=common) attributes. The conjoined event types are called "base" event types in the following. Base event types can be concrete or also virtual.

Virtual event types are constructed based on the current structure of their base event types. If one of the base event types changes (e.g. an attribute is removed or added), the virtual event type reflects this change. Consequently, a virtual event type represents a view of conjunct attributes from its base event types.

Every existing event always conforms to one concrete event type. Furthermore, an event can be compatible to one or more virtual event types which have to be based on the underlying concrete event type.

In order to determine whether an existing event is compatible to a virtual event type, the concrete event type of the event is used to recursively check whether it is contained in one of the base event types of the virtual event type.

Figure 11:
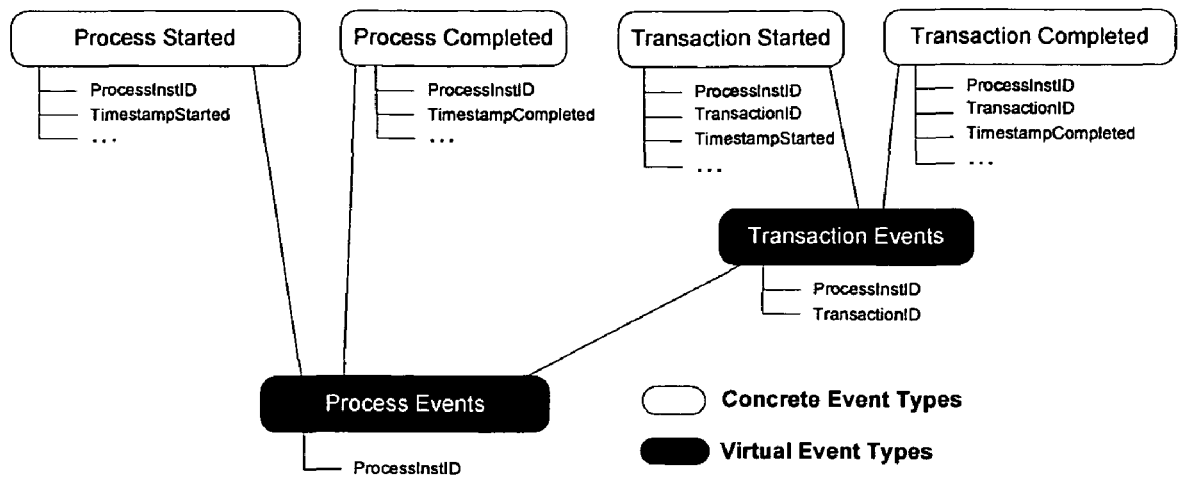
FIG. 11 shows a further preferred embodiment of the methods of FIG. 1 to 10 with virtual events types defined for event data packets.

FIG. 11 shows an example of concrete and virtual event types for process events. The event types "Process Started", "Process Completed", "Transaction Started" and "Transaction Completed" are concrete since they do not have any base event type. There are several virtual event types derived from these concrete event types, such as the "Transaction Events" event type which contains all conjunct attributes of concrete transaction events (=ProcessInstID, TransactionID), or the "Process Events" event type which contains all conjunct attributes of the other shown event types (=ProcessInstID).

There is one special event type (called "All Events") that has all existing (concrete and virtual) event types as base event types.

It should be noted that virtual event types are not comparable with the concept as inheritance. Inheritance is a top down process in order to specialize event types. In the case of inheritance, the base event types would contain common characteristics of the new event types which are further extended. Therefore, in general, the number of attributes increases for specialized event types.

In contrast thereto, virtual event types are constructed the other way around. Based on specialized event types, new event types with only conjunct attributes are created. Therefore, in general, the number of attributes decreases for virtual event types, i.e. virtual event types

- combine common (=conjunct) attributes of the base event types;
- are always compatible to their base event types;
- can be based on other virtual event types (virtual event types can be nested);
- the root nodes of a virtual event type hierarchy are always concrete event types; and
- the special virtual event type "All Events" is compatible to all (concrete and virtual) event types.

Figure 12:
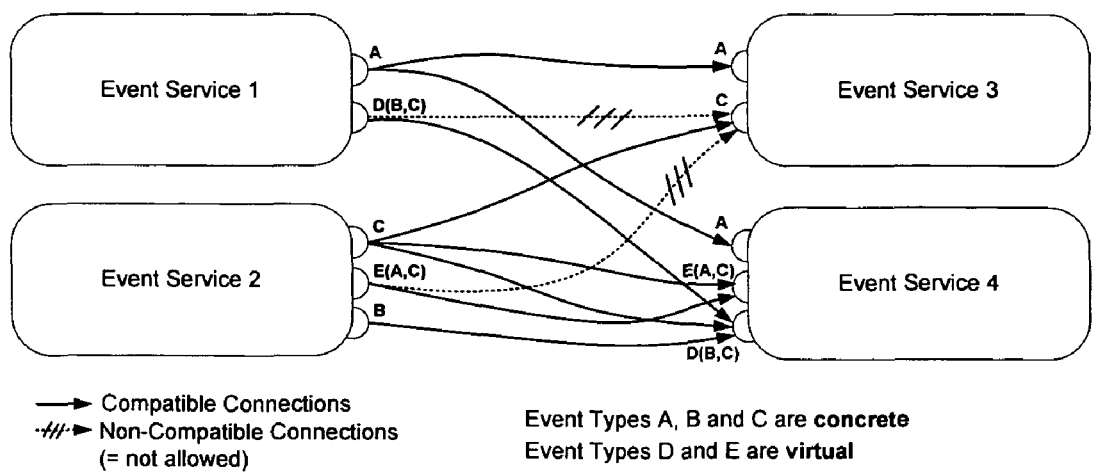
FIG. 12 shows an application of the virtual event types of FIG. 11 for establishing event flows between event processing tasks.

Concrete and virtual event types can be used to model event streams between components for the event processing such as event services. FIG. 12 shows four event processing tasks (Event Service 1, Event Service 2, Event Service 3, Event Service 4) with various input and output interfaces that conform to event types. Some of these event types are concrete and some are virtual ones.

Various rules for using multiple event types for an event stream in order to connect event services are advisable:

1. Concrete event type: An event type is only compatible to another concrete event type when they are both equal.

2. Virtual event type: An event type that is only compatible to another virtual event type when they are either equal or the event type is (recursively) one of the base event types of the virtual event type.

The second rule for virtual events enables a more efficient management of event streams since the input/output interfaces of the event services for the event stream do not have to be equal—they only have to be compatible.

For instance, "Event Service 2" has interfaces with the concrete event type B and C, and the virtual event type E. The virtual event type E has the base event types A and C.

The interface of the "Event Service 2" with the concrete event type C can be connected with the virtual event type E on "Event Service 4" since this event type E contains the event type C in its base event types.

The following table shows a summary matrix of the compatibility of the event types from FIG. 12:

| Event Types | A | B | C | D(B, C) | E(A, C) |
|---|---|---|---|---|---|
| A | compatible | | | | |
| B | | compatible | | | |
| C | | | compatible | | |
| D(B, C) | | compatible | compatible | compatible | |
| E(A, C) | compatible | | compatible | | compatible |

The invention is not limited to the specific examples described herein but covers all modifications and embodiments within the scope of the appended claims.

The invention claimed is:

1. A method of identifying a plurality of packets associated with correlating events in a stream of data packets of a distributed computing network having a central administration node and a plurality of worker nodes, the method comprising:
    classifying a plurality of events according to event types that define the structure of events;
    providing in each data packet of the stream an event type identifier and an attribute associated with the event type identifier, the event type identifier indicating a type of a particular event from the classified events represented by each data packet, the attribute having a value indicating a context associated with a result of a system transaction within which the particular event occurred;
    applying a correlation set of selectors to said stream on a worker node, the correlation set of selectors including a first selector being responsive to data packets of a first event type identifier and extracting one or more first attributes from the data packets of the first event type identifier, each of the first attributes having a value associated therewith, the correlation set of selectors including a second selector being responsive to data packets of a second event type identifier and extracting one or more second attributes from the data packets of the second event type identifier, each of the second attributes having a value associated therewith;
    assessing on the worker node two or more data packets of said stream as being associated with correlating events if the value of the first attributes associated with the first event type identifier and the value of the second attributes associated with the second event type identifier extracted by the correlation set of selectors from the two or more data packets match; and
    accessing via the worker node a correlation session in a data store managed by said central administration node for each correlation assessed, said correlation session holding data items of tasks processing said correlating events.

2. The method according to claim 1, further comprising:
    creating said correlation session in said data store by said administration node.

3. The method according to claim 1, wherein the access to correlation sessions in the data store is restricted by the administration node to a maximum allowable number of concurrently accessing worker nodes.

4. The method according to claim 2, wherein the steps of creating and accessing correlation sessions are performed via transactional processing.

5. The method according to claim 2, wherein the data items in correlation sessions expire within a predetermined span of time.

6. The method according to claim 2, wherein the correlation sessions are recoverable by storing the correlation sessions in a persistent data repository.

7. The method according to claim 1, further comprising:
    creating or accessing a lock in a data store for each correlation assessed, said lock used for synchronizing tasks processing said correlating events.

8. The method according to claim 7, wherein said synchronizing comprises restricting the maximum number of concurrent processing tasks for correlated events.

9. The method according to claim 7, wherein said synchronizing comprises serializing the order of processing tasks for correlated events.

10. The method according to claim 7, wherein locks are managed centrally by the administration node.

11. The method according to claim 7, wherein the steps of creating and accessing locks are performed via transactional processing.

12. The method according to claim 1, further comprising at least one selector which is responsive to data packets of a set of predetermined event types, said set being defined as a virtual event type.

13. The method according to claim 12, wherein at least one virtual event type is composed of at least one other virtual event type.

14. The method according to claim 12, wherein there is one virtual event type which is composed of all events types.

15. The method according to claim 12, wherein at least one virtual event type carries selected attributes of its composing events types only.

16. The method according to claim 12, wherein the virtual event types are used to establish, trigger, or control event flows between processing tasks.

17. A computer-readable storage medium comprising operational instructions that, when executed by a processor, cause the processor to:
    classifying a plurality of events according to event types that define the structure of events;

provide in each data packet of a stream of data packets an event type identifier and an attribute associated with the event type identifier, the event type identifier indicating a type of a particular event from the classified events represented by each data packet, the attribute having a value indicating a context associated with a result of a system transaction within which the particular event occurred;

apply a correlation set of selectors to said stream, the correlation set of selectors including a first selector being responsive to data packets of a first event type identifier to extract one or more first attributes from the data packets of the first event type identifier, each of the first attributes having a value associated therewith, the correlation set of selectors including a second selector being responsive to data packets of a second event type identifier to extract one or more second attributes from the data packets of the second event type identifier, each of the second attributes having a value associated therewith;

assess two or more data packets of said stream as being associated with correlating events if the value of the first attributes associated with the first event type identifier and the value of the second attributes associated with second event type identifier extracted by the correlation set of selectors from the two or more data packets match; and access a correlation session in a data store for each correlation assessed, said correlation session holding data items of tasks processing said correlating events.

18. The computer-readable storage medium of claim 17, further comprising operational instructions that, when executed by a processor, cause the processor to create or access a lock in a data store for each correlation assessed, said lock used to synchronize tasks processing said correlating events.

19. The computer-readable storage medium of claim 17, wherein at least one selector which is responsive to data packets of a set of predetermined event types, said set being defined as a virtual event type.

20. A method of identifying a plurality of packets associated with correlating events in a stream of data packets, the method comprising:

receiving a plurality of data packets of said stream at a work node, each data packet of said plurality of data packets including an event type identifier and an attribute associated with the event type identifier, the event type identifier indicating a type of a particular event from a plurality of possible events represented by each data packet, the attribute having a value indicating a context associated with a result of a system transaction within which the event occurred;

applying at said work node a correlation set of selectors to said received plurality of data packets, the correlation set of selectors including a first selector being responsive to data packets of a first event type identifier to extract one or more first attributes each having a value associated therewith and a second selector being responsive to data packets of a second event type identifier to extract one or more second attributes each having a value associated therewith;

assessing at said work node two or more data packets of said received plurality of data packets as being associated with correlating events if the value of the first attributes associated with the first event type identifier and the value of the second attributes associated with the second event type identifier extracted by said correlation set of selectors from said two or more data packets match; and accessing via said work node a correlation session in a data store managed by an administration node for each correlation assessed, said correlation session holding data items of tasks that process said correlating events.

* * * * *